United States Patent [19]

Nakayama et al.

[11] Patent Number: 5,068,841
[45] Date of Patent: Nov. 26, 1991

[54] MAGNETO-OPTICAL RECORDING/REPRODUCING DEVICE

[75] Inventors: Junichiro Nakayama; Hiroyuki Katayama; Kenji Ohta, all of Nara, Japan

[73] Assignee: Sharp Kabushiki Kaisha, Osaka, Japan

[21] Appl. No.: 633,406

[22] Filed: Dec. 21, 1990

[30] Foreign Application Priority Data

Dec. 28, 1989 [JP] Japan ............... 1-342982

[51] Int. Cl.$^5$ ............... G11B 21/00; G11B 21/02
[52] U.S. Cl. ............... 369/13; 360/75; 360/104; 360/105
[58] Field of Search ............... 360/75, 103, 104, 114, 360/59; 369/13; 365/122

[56] References Cited

U.S. PATENT DOCUMENTS

| 4,146,911 | 3/1979 | Gyi | 360/75 |
|---|---|---|---|
| 4,280,156 | 7/1981 | Villette | 360/75 |
| 4,393,425 | 7/1983 | Wright | 360/75 |
| 4,777,544 | 10/1988 | Brown | 360/75 |
| 4,814,906 | 3/1989 | Suzuki | 360/75 |
| 4,814,907 | 3/1989 | Goor | 360/75 |
| 4,843,502 | 7/1989 | Tagawa | 360/75 |
| 4,931,887 | 6/1990 | Hegde | 360/75 |

FOREIGN PATENT DOCUMENTS

| 0121975 | 10/1984 | European Pat. Off. . | |
| 0157878 | 9/1984 | Japan | 360/75 |
| 0175275 | 7/1988 | Japan | 360/75 |
| 0197056 | 8/1988 | Japan | 360/104 |
| 1-251360 | 10/1989 | Japan . | |
| 0296455 | 11/1989 | Japan | 360/104 |
| 1-251359 | 12/1989 | Japan . | |
| 1-3233322 | 12/1989 | Japan . | |

OTHER PUBLICATIONS

"A Quarter Century of Disk File Innovation", Harker et al., IBM J. Res. Develop., vol. 25, No. 5, Sep. 1981.

Primary Examiner—Stuart S. Levy
Assistant Examiner—John C. Pokotylo
Attorney, Agent, or Firm—David G. Conlin; Robert M. Asher

[57] ABSTRACT

A magneto-optical recording/reproducing device having a slider provided with a magnetic head. The slider floats over a magneto-optical disk when the magneto-optical disk is in rotation. The slider is supported by a suspension. A depressing force is exerted on the slider vertically by the suspension. The depressing force is adjusted by an adjustment device so that the depressing force due to the suspension increases as the slider shifts to an outer part of the magneto-optical disk from an inner part. Thus a floating gap between the slider and the magneto-optical disk becomes substantially constant irrespective of a radial position on the magneto-optical disk and a magnetic field intensity applied onto the magneto-optical disk from the slider (the magnetic head) becomes constant. As a result, stable recordomg, reproducing and erasing operations can be carried out.

8 Claims, 4 Drawing Sheets

MAGNETO-OPTICAL RECORDING/REPRODUCING DEVICE

FIELD OF THE INVENTION

The present invention relates to a magneto-optical recording/reproducing device using a start-and-stop-in-contact head for carrying out stable recording and reproducing operations by maintaining a constant floating gap between the start-and-stop-in-contact head and a recording medium.

BACKGROUND OF THE INVENTION

In a conventional magneto-optical recording method a vertically magnetized film composed of metal magnetic material coated onto a substrate made of glass, plastic, ceramic or other material serves as a recording medium, and recording and reproducing operations on and from the recording medium are carried out as described hereinbelow.

In the recording operation, first of all initialization is performed by arranging a magnetization direction of the recording medium to a predetermined direction (upward direction or downward direction) according to an external magnetic field or the like. Then a temperature of a recording portion where the recording is to be carried out is raised to a point above the vicinity of the Curie temperature or to a point above the vicinity of the magnetic compensation temperature by projecting a laser beam on the recording area. As a result, a magnetic coercive force at the recording portion becomes zero or substantially zero. The magnetization direction is then reversed by applying the external magnetic field, based on the fact that this external magnetic field has a reverse magnetization direction with respect to the magnetization direction of the initialized recording medium. After that, when the projection of the laser beam is stopped, the recording portion of the recording medium returns to room temperature. A reversed magnetization is thus fixed and information is recorded thermo-magnetically.

In the reproducing operation a linearly polarized laser beam is projected onto the recording medium. A polarization plane of reflected light or transmitted light from or through the recording medium has a direction of rotation that varies according to a magnetization direction of the recording portion (Kerr effect or Faraday effect). Information is optically read out according to differences in the direction of rotation of the polarization plane.

Recording media used in the magneto-optical recording method have been noted as large capacity memory elements of a re-writable type. However, there are two methods for re-writing over the information recorded on the recording medium, described in (i) and (ii) hereinbelow.

(i) A method wherein a deletion of the previously recorded information is performed by initializing the recording medium once again.

(ii) A method wherein a recording medium or an external magnetic field generating device is improved so that overwriting, i.e., direct re-writing of the information without performing the deletion, may be carried out.

If the method (i) is adopted, either an initialization device or two heads must be installed, thereby causing a rise in cost. Moreover, when only one head is provided and the deletion is performed according to the method (i) the deletion operation is inefficient because the deletion operation requires the same amount of time as the recording operation.

On the other hand, if the method (ii) is adopted and an improvement in the recording medium is carried out, it is generally accompanied by difficulties in controlling film composition and film thickness and so on. For this reason, the most suitable method in (ii) is regarded as improving the external magnetic field generating device, i.e., switching a direction of the external magnetic field at high speed while keeping an intensity of the laser beam constant.

In order to switch a direction of the external magnetic field at high speed it is necessary to have a low impedance by making a coil and a coil core of the external magnetic field generating device extremely small. However, a generating area of the magnetic field becomes smaller as a coil and a coil core are made smaller. In order to counteract this, a magnetic head and a recording medium must be brought closer to each other. Thus, as shown in FIG. 7, generally a start-and-stop-in-contact head of a sliding type is adopted. The start-and-stop-in-contact head permits the external magnetic field generating device to glide over a recording medium (not shown). The magnetic head (not shown) is provided on a slider 1 The slider 1 is supported by a suspension 3 made of a leaf spring or the like, a base section of the suspension 3 being joined to a supporting base 2. The slider 1 is suspended from the suspension 3 and thus a depressing force is exerted on the slider 1 in a vertical direction with respect to a surface of the recording medium. When the recording medium is rotated the slider 1 is designed to float above the surface of the recording medium.

A constant floating gap between the slider 1 and the recording medium is maintained due to the fact that a floating force balances with the depressing force. The floating force is exerted upwards on the slider 1 by an air flow between the slider 1 and the recording medium. The depressing force is exerted downwards on the slider 1 by the suspension 3. The start-and-stop-in-contact head of this type is used for conventional hard disks for computers as well. In the case of the hard disks the floating gap is of a submicron order. However, when the recording medium is a magneto-optical disk, a floating gap of $5\mu m$–$15\mu m$ is necessary since magneto-optical disks are transportable. This increased gap is necessary for the following reasons.

Since magneto-optical disks are transportable, the likelihood of dirt and so on sticking on the surface increases. If the slider 1 and the magneto-optical disk approach too close to one another they may collide. For example, if a magneto-optical disk has an uneven surface the air flowing past the slider is disturbed. As a result, the floating force exerted by the air on the slider 1 changes and the gap between the magneto-optical disk and the slider 1 no longer remains constant.

Thus, in the case of a transportable magneto-optical disk the gap of $5\mu m$–$15\mu m$, a larger gap than the gap required for a hard disk, is necessary. Therefore, as shown in Table 1, the floating gap changes depending on a relative velocity between the magneto-optical disk and the slider 1. For example, if the relative velocity doubles, the floating gap increases by a substantial one and half times (here, the dimensions of the slider 1 are 6mm×4 mm). Thus, the floating gap increases as an outer part of the magneto-optical disk is approached from an inner part since the relative velocity increases as the outer part is approached. Consequently, a magnetic field intensity applied to the magneto-optical disk changes according to a radial position on the magneto-optical disk, and the recording operation cannot be carried out under constant conditions.

TABLE 1

| (a relationship between the relative velocity and the floating gap) | | |
|---|---|---|
| | V | |
| F | 10 m/s | 20 m/s |
| 5 gf | 6.5 μm | 10 μm |
| 10 gf | 4 μm | 6.5 μm |

Where, F: depressing force due to the suspension
V: head-medium relative velocity

SUMMARY OF THE INVENTION

It is an object of the present invention to provide a magneto-optical recording/reproducing device which is capable of carrying out stable recording and reproducing operations under constant conditions by maintaining a substantially constant floating gap between a start-and-stop-in-contact head and a recording medium.

In order to achieve the above object, a magneto-optical recording/reproducing device of the present invention is characterized in that adjustment means is provided for adjusting a depressing force exerted on a slider by a suspension, so that the depressing force increases as the slider shifts to an outer part of a magneto-optical recording medium from an inner part.

With the above arrangement, when the magneto-optical recording medium is in rotation, both the floating force exerted upwards on the slider and the depressing force exerted on the slider by the suspension increase as the slider shifts to an outer part of the magneto-optical recording medium. As a result, a constant floating gap is attained irrespective of a radial position on the magneto-optical recording medium due to the floating force exerted upwards on the slider balancing with the depressing force exerted downwards on the slider by the suspension. Consequently, recording and reproducing operations can be carried out under substantially constant conditions irrespective of the radial position since a magnetic field intensity applied onto the magneto-optical recording medium from the magnetic head remains substantially constant.

For a fuller understanding of the nature and advantages of the invention, reference should be made to the ensuing detailed description taken in conjunction with the accompanying drawings. cl BRIEF DESCRIPTION OF THE DRAWINGS FIGS. 1 to 4 show a first embodiment of the present invention.

Figure 4:
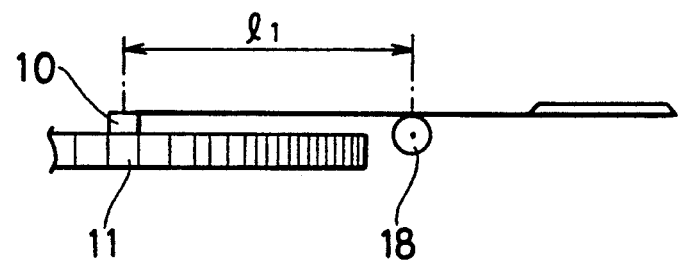
Figure 4:
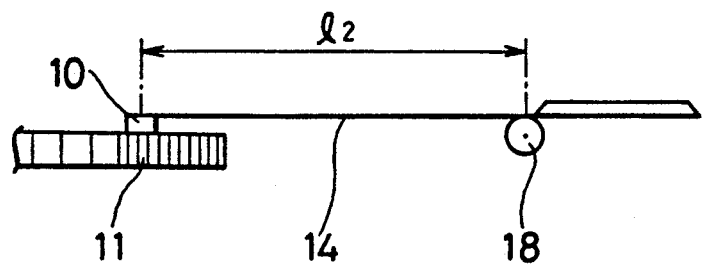

FIGS. 4(a) and (b) show schematic side views of shifting of a supporting member.

Figure 5:
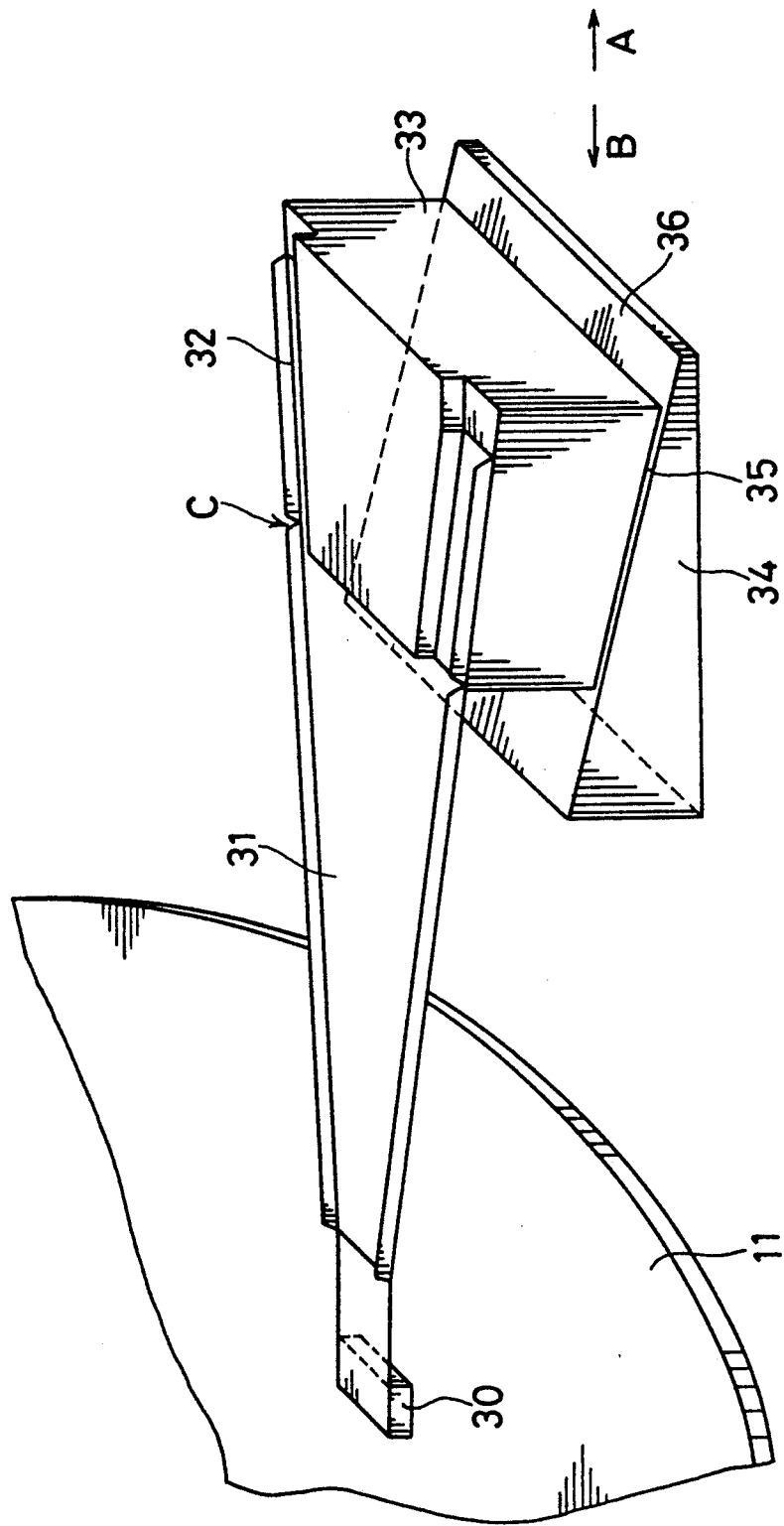
Figure 6B:
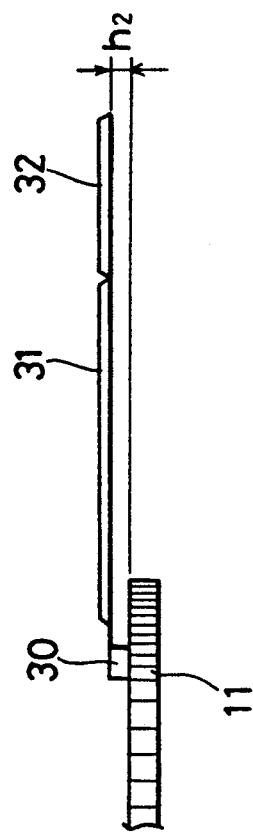

FIGS. 5 and 6 show a second embodiment of the present invention.

FIG. 5 shows a perspective view of essential parts of a magneto-optical recording/reproducing device.

Figure 6A:
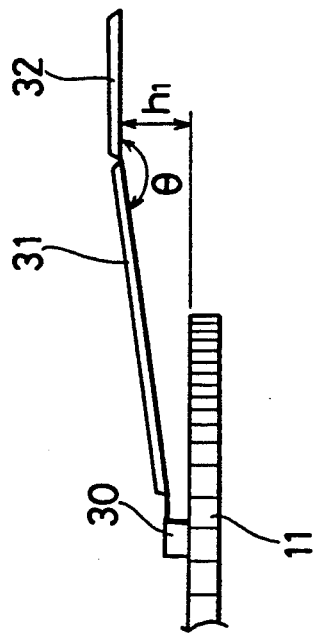

FIGS. 6(a) and (b) show schematic side views of shifting of a base section of a suspension.

Figure 7:
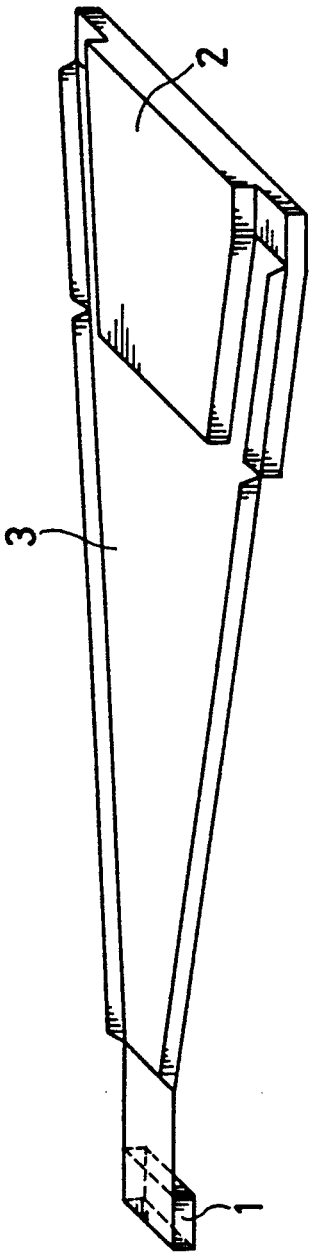

FIG. 7 shows a perspective view of essential parts of a conventional magneto-optical recording/reproducing device.

DESCRIPTION OF THE EMBODIMENTS

The following description will discuss a first embodiment of the present invention referring to FIGS. 1 to 4.

Figure 3:
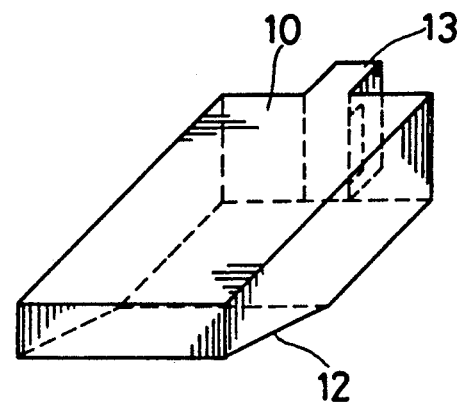
FIG. 3 shows a perspective view of a slider.

A magneto-optical recording/reproducing device of the first embodiment is provided with a slider 10 as shown in FIG. 3. An inclined face 12 is provided along an end face that is at a right angle to a radial direction on a magneto-optical disk 11 (see FIG. 4(a) or (b)) serving as a magneto-optical recording medium. The inclined face 12 serves to permit an air flow between the slider 10 and the magneto-optical disk 11. Further, a magnetic head 13 is provided at an end face opposite to the end face where the inclined face 12 is provided, i.e., at an end from where the air flows out after passing through under the slide 10. Moreover, although not specifically shown, the magneto-optical disk 11 has at least a substrate and a magneto-optical recording layer. A reflecting layer, a protective layer and other layers are provided as necessary.

Figure 1:
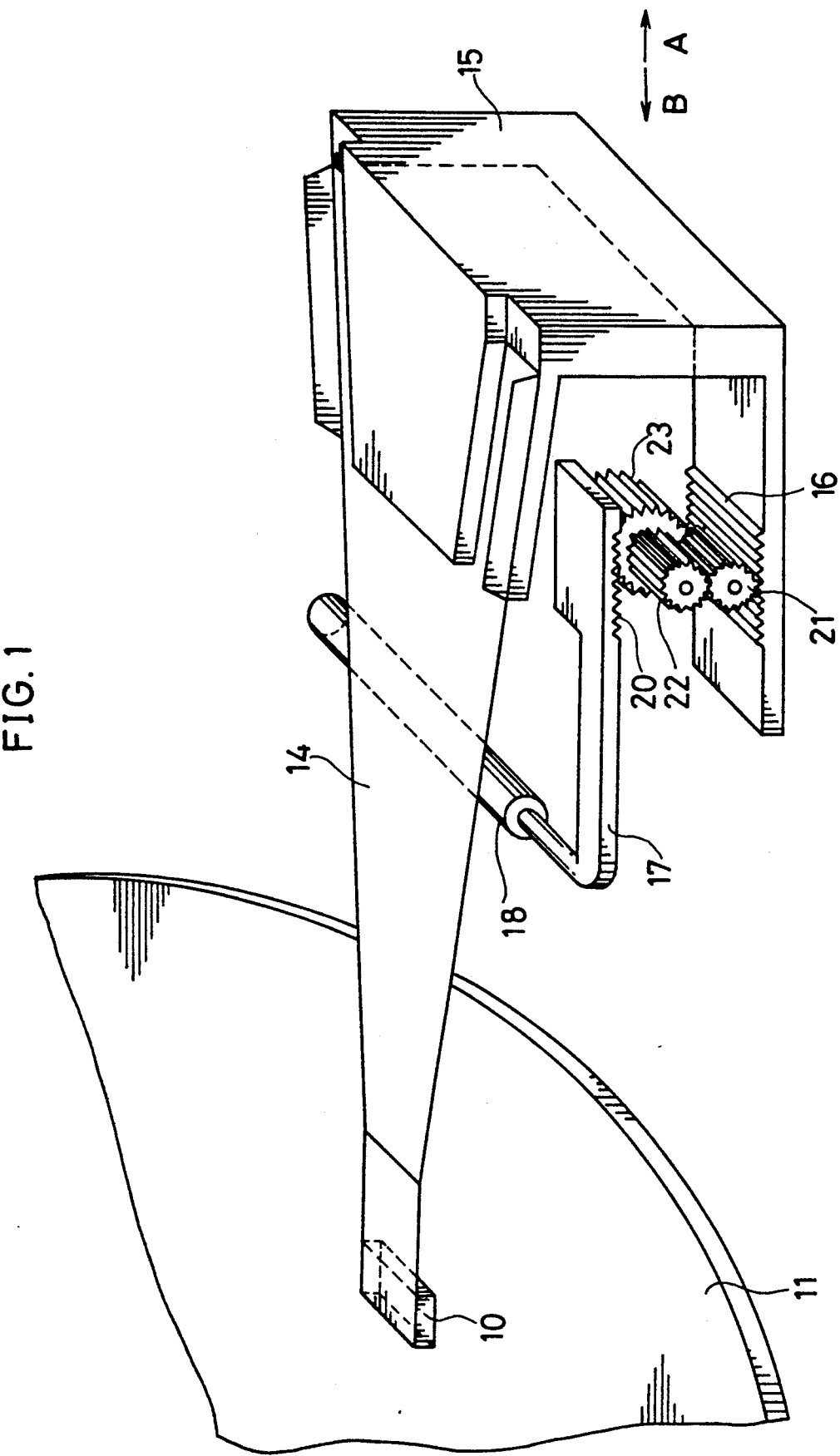
FIG. 1 shows a perspective view of essential parts of a magneto-optical recording/reproducing device.

Referring to FIG. 1, the slider 10 is attached by a gimbal (not shown) to a free edge of a suspension 14. The magnetic head 13 is coupled to the suspension 14 through the gimbal. Thus, the slider 10 is flexibly movable backwards and forwards as well as left and right.

A base section of the suspension 14 is supported by being connected to an upper horizontal section of a supporting base 15 that is substantially U-shaped when viewed from the side. The suspension 14 is made of, for example, a leaf spring and a depressing force is exerted on the slider 10 (the magnetic head 13) by the suspension 14 in a downward direction towards the magneto-optical disk 11. The supporting base 15 can be shifted by shifting means (not shown) as shown by arrows A and B in a radial direction of the magneto-optical disk 11.

A rack 16 is provided on a lower horizontal section of the supporting base 15. The rack 16 extends in a radial direction of the magneto-optical disk 11. An arm 17 that is substantially L-shaped is provided horizontally in a space between the two horizontal sections of the supporting base 15 A cylindrical supporting member 18 is provided on a section of the arm 17 extending at a right angle to a radial direction of the magneto-optical disk 11. The supporting member 18 supports the suspension 14 from below. The depressing force is exerted vertically downwards on the slider 10 with respect to the surface of the magneto-optical disk 11 by a part of the suspension 14 projecting from the supporting member 18 towards the magneto-optical disk 11 in a radial direction.

Figure 2:
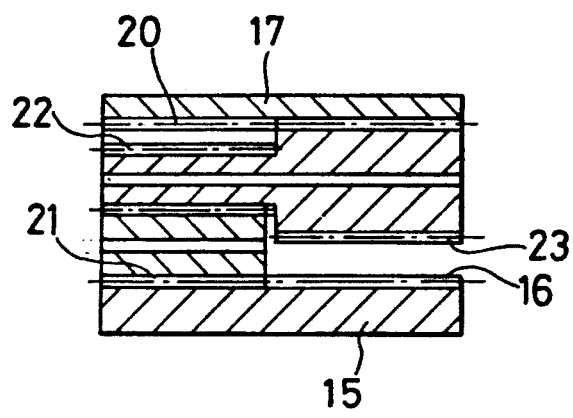
FIG. 2 shows an enlarged vertical longitudinal sectional view of essential parts of the magneto-optical recording/reproducing device shown in FIG. 1.

On a section of the arm 17 extending towards a radial direction of the magneto-optical disk a rack 20 opposed to the rack 16 is provided. A pinion 21 engages the rack 16 and a pinion 22 engages the pinion 21. The pinion 21 and the pinion 22 are respectively supported by supporting axes (not shown) so as to rotate around them. Further, as shown in FIG. 2, a pinion 23 is provided having the same supporting axis as the pinion 22 but having a greater diameter and a larger number of teeth than the pinion 22. The pinion 22 and the pinion 23 are designed to rotate integrally. The pinion 23 engages the rack 20. Supporting member shifting means is composed of the racks 16 and 20 and the pinions 21, 22 and 23. Further, adjustment means is composed of the supporting member shifting means and the supporting member formed by arm 17 and the cylindrical supporting member 18.

Moreover, the magneto-optical recording/reproducing device is provided with an optical head (not shown) that projects a laser beam onto the magneto-optical disk 11. The optical head and the slider 10 are located, for example, opposing to each other and facing opposite surfaces of the magneto-optical disk 11. The optical head moves with the slider so that a position whereto a laser beam is projected by the optical head is controlled to coincide with a position whereto a magnetic field is applied by the magnetic head 13 attached to the slider 10.

With the above arrangement, when the magneto-optical disk 11 is stationary the slider 10 is in contact with the surface of the magneto TM optical disk 11. This is due to the depressing force exerted downwards on the slider 10 by the suspension 14. When the magneto-optical disk 11 starts rotating during a recording operation, an air flow begins between the slider 10 and the magneto-optical disk 11 from the inclined face 12 provided on the slider 10. As a result the slider 10 gradually begins to float above the surface of the magneto-optical disk 11. Then, once the magneto-optical disk 11 attains a steady state velocity, a floating force on the slider 10 directed upwards due to the air flow balances with the depressing force directed vertically downwards due to the suspension 14. Thus a predetermined floating gap is attained between the slider 10 and the magneto-optical disk 11. Thereafter, the magneto-optical disk 11 is rotated with constant angular velocity (CAV) control.

Information is then recorded according to the overwrite method wherein a laser beam is projected by the optical head onto a magneto-optical disk 11 together with a magnetic field being applied by the magnetic head 13 of the slider 10 onto the magneto-optical disk 11.

Further, when information is to be recorded continuously or when a desired address is to be accessed and so on, the supporting base 15 shifts in a radial direction of the magneto-optical disk 11 indicated by the arrow A or B The suspension 14 (the slider 10) also shifts in the direction indicated by the arrow A or B when the supporting base 15 shifts. The supporting member 18 also shifts in the same direction as the supporting base 15 by a transmission of power according to the engagements of the pinions 21, 22 and 23. However, the shift amount of the supporting member 18 in a radial direction of the magneto-optical disk 11 is greater than that of the supporting base 15, i.e., the suspension 14 This is because the number of teeth on the pinion 23 is greater than the umber of teeth on the pinion 22.

That is, when the suspension 14 provided with the slider 10 shifts radially from an inner part of the magneto-optical disk 11, shown in FIG. 4(a), to an outer part, shown in FIG. 4(b), the supporting member 18 also shifts radially outwards. However, the shift amount of the supporting member 18 is greater than that of the suspension 14. When on the other hand the suspension 14 shifts to an inner part of the magneto-optical disk 11 from an outer part, in this case too the shift amount of the supporting member 18 is greater than that of the suspension 14.

As a result, a projecting length (projecting length $l_2$) of the suspension 14 from the supporting member 18 is greater when the slider 10 is located at an outer part of the magneto-optical disk 11, as shown in FIG. 4(b), than a projecting length (projecting length $l_1$) of the suspension 14 when the slider 10 is located at an inner part of the magneto-optical disk 11, as shown in FIG. 4(a). Consequently, the depressing force exerted on the slider 10 by the suspension 14 increases as the slider shifts to an outer part of the magneto-optical disk 11.

On the other hand, a relative velocity between the slider 10 and the magneto-optical disk 11, i.e., a linear velocity of the magneto-optical disk 11, increases as the slider 10 shifts to an outer part of the magneto-optical disk 11. This is because the magneto-optical disk 11 is rotated with a constant angular velocity. Consequently, the floating force exerted upwards on the slider 10 increases as the slider shifts to an outer part of the magneto-optical disk 11. As a result, the floating gap between the slider 10 and the magneto-optical disk 11 remains substantially constant irrespective of a radial position of the slider 10 on the magneto-optical disk 11. According to this arrangement, a magnetic field can be applied under substantially constant conditions onto the magneto-optical disk 11 from the magnetic head 13 provided on the slider 10. Further, the ratio of a shift amount of the suspension 14 to a shift amount of the supporting member 18 is set so that the floating gap between the slider 10 and the magneto-optical disk 11 normally remains substantially constant irrespective of a radial position of the slider 10, based on the fact that the depressing force exerted by the suspension 14 balances with the floating force exerted when the magneto-optical disk 11 is in rotation.

On the other hand, during a reproducing operation the information can be read out optically by projecting a linearly polarized laser beam onto the magneto-optical disk 11 from the above mentioned optical head.

The following description will discuss a second embodiment of the present invention referring to FIGS. 5 and 6.

As shown in FIG. 5, a magneto-optical recording/reproducing device is provided with a slider 30 having a magnetic head (not shown) similar to the magnetic head 13 mentioned above. The slider 30 is attached to a free edge of a suspension 31. A depressing force is exerted vertically downwards on the slider 30 with respect to the surface of a magneto-optical disk 11 by the suspension 31. A base section 32 of the suspension 31 is supported by being connected to a supporting base 33. The suspension 31 is made of a leaf spring so as to be capable of bending downwards from an edge C that serves as a fulcrum Beyond the edge C the suspension 31 projects out of the supporting base 33.

The supporting base 33 is placed on an inclined stand 34 and can shift freely in directions indicated by arrows A and B. The supporting base 33 is designed so that a height of a lower inclined face 35 of the supporting base 33 (a height of the lower inclined face 35 from a lower face of the inclined stand 34) decreases in the direction indicated by the arrow A, i.e., in the radially outwards direction of the magneto-optical disk 11. The inclined stand 34 is also designed so that a height of an upper inclined face 36 of the inclined stand 34 (a height of the upper inclined face 36 from the lower face of the inclined stand 34) decreases in the direction indicated by the arrow A. The lower inclined face 35 and the upper inclined face 36 serve as base section shifting means. When the supporting base 33 shifts in the direction indicated by the arrow A or B the base section 32 shifts respectively in a vertically downward or upward direction with respect to a surface of the magneto-optical disk 11, according to a relative shift that takes place between the lower inclined face 35 and the upper inclined face 36.

That is, as shown in FIG. 6(a), when the slider 30 is located on an inner part of the magneto-optical disk 11, a distance $h_1$ in the vertical direction between the base section 32 and the magneto-optical disk is large (a bend angle $\theta$ in a downward direction is small). As a result, the depressing force exerted on the slider 30 by the suspension 31 becomes relatively small. On the other hand, when the slider 30 is located on an outer part of the magneto-optical disk 11, a distance $h_2$ in the vertical direction between the base section 32 and the magneto-optical disk is small (the bend angle $\theta$ is large, substantially 180°). As a result, the depressing force exerted on the slider 30 by the suspension 31 becomes greater when the slider 30 is on an outer part than when the slider 30 is on an inner part. Consequently, in the present embodiment as well, a floating gap between the slider 30 and the magneto-optical disk 11 remains substantially constant irrespective of a radial position of the slider 30 on the magneto-optical disk 11. Further, as is evident from the above description, the depressing force exerted on the slider 30 by the suspension 31 becomes greatest when the bend angle $\theta$ of the suspension 31 is substantially 180°, i.e., when the suspension 31 is horizontal. The depressing force gradually becomes smaller as the bend angle $\theta$ of the suspension 31 in the downward direction becomes smaller.

As described above, a magneto-optical recording/reproducing device of the present invention is characterized in comprising:

a slider, having a magnetic head, that floats above a surface of a magneto-optical recording medium when the magneto-optical recording medium is in rotation;

a suspension that supports the slider and that depresses the slider towards the magneto-optical recording medium; and adjustment means for adjusting a depressing force exerted on the slider by the suspension so that the depressing force increases as the slider shifts to an outer part of the magneto-optical recording medium from an inner part.

Further, said adjustment means can comprise:

a supporting member that supports the suspension while relatively shifting with respect to the suspension in a radial direction of the magneto-optical recording medium; and supporting member shifting means for relatively shifting the supporting member with respect to the suspension so that a projecting length of the suspension from the supporting member increases as the slider shifts to an outer part of the magneto-optical recording medium from an inner part thereof.

Alternatively, the adjustment means can comprise:

base section shifting means for shifting a base section of the suspension in a vertical direction with respect to the surface of the magneto-optical medium so that a distance in the vertical direction between the base section and the surface of the magneto-optical recording medium decreases as the slider shifts to an outer part of the magneto-optical recording medium from an inner part.

According to the above arrangement, the floating force exerted on the slider when the magneto-optical recording medium is in rotation increases as the slider shifts to an outer part of the magneto-optical recording medium from an inner part. At the same time, the depressing force exerted on the slider by the suspension also increases corresponding to the floating force as the slider shifts to an outer part of the magneto-optical recording medium. Consequently, based on the fact that the floating force balances with the depressing force, the floating gap between the slider and the magneto-optical recording medium remains substantially constant irrespective of a radial position of the slider on the magneto-optical recording medium. Thus a recording operation can be carried out under substantially constant conditions irrespective of a radial position since a magnetic field intensity applied onto the magneto-optical recording medium from the magnetic head located on the slider becomes substantially constant.

As noted above, in the case where the adjustment means comprises the supporting member and the supporting member shifting means, the supporting member is made to shift by the supporting member shifting means so that the projecting length of the suspension from the supporting member increases as the slider shifts to an outer part of the magneto-optical recording medium. Thus the depressing force exerted on the slider by the suspension increases as the slider shifts to an outer part of the magneto-optical recording medium since the depressing force increases as the projecting length from the supporting member increases.

On the other hand, in the case where the adjusting means comprises the base section shifting means, the base section of the suspension is made to shift downwards or upwards in a vertical direction with respect to the surface of the magneto-optical medium. Here too the depressing force exerted on the slider by the suspension increases as the slider shifts to an outer part of the magneto-optical recording medium since the vertical distance between the base section and the magneto-optical recording medium decreases as the slider shifts to an outer part of the magneto-optical recording medium.

The invention being thus described, it may be obvious that the same may be varied in many ways. Such variations are not to be regarded as a departure from the scope of the invention.

A skilled man will appreciate that many of the above described novel features give rise to advantages. These are each independent aspects of the invention to be covered by the present application, irrespective of whether or not they are included within the scope of the following claims.

What is claimed is:

1. A magneto-optical recording/reproducing device comprising:

a slider, having a magnetic head, that floats above a surface of a magneto-optical recording medium when the magneto-optical recording medium is in rotation;

a suspension that supports the slider, a depressing force being exerted on the slider by the suspension in a vertical direction with respect to the magneto-optical recording medium; and adjustment means for adjusting the depressing force exerted on the slider by the suspension so that the depressing force increases as the slider shifts to an outer part of the magneto-optical recording medium from an inner part.

2. A magneto-optical recording/reproducing device as set forth in claim 1, wherein the adjustment means comprises:

a supporting member that supports the suspension such that a projecting length of the suspension extends from the supporting member to said slider; and supporting member shifting means for relatively shifting the supporting member with respect to the suspension so that the projecting length of the suspension increases as the slider shifts to an outer part of the magneto-optical recording medium from an inner part.

3. A magneto-optical recording/reproducing device as set forth in claim 2, further comprising:

a substantially U-shaped supporting base connected to a part of the suspension for supporting said part of the suspension and for shifting freely in a radial direction of the magneto-optical recording medium.

4. A magneto-optical recording/reproducing device as set forth in claim 3, further comprising a substantially L-shaped arm having a first arm section and a second arm section, wherein the supporting member having a cylindrical shape is provided on the first arm section and the supporting member shifting means includes:

a first rack that extends in a radial direction of the magneto-optical recording medium and provided on the supporting base;

a first pinion member that engages the first rack and is rotatable;

a second pinion member that engages the first pinion member and is rotatable;

a third pinion member that rotates integrally with the second pinion member and that has a greater diameter and a larger number of teeth than the second pinion member; and a second rack provided on the second arm section so as to oppose the first rack and that engages the third pinion member, whereby the supporting base and the supporting member shift in the same direction and a shift amount of the supporting member is greater than that of the supporting base.

5. A magneto-optical recording/reproducing device as set forth in claim 1, wherein the slider, has a first end and a second end that are at right angles with respect to a radial direction on the magneto-optical recording medium, the first end having an inclined face thereon that permits an air flow between the slider and the magneto-optical recording medium, and the second head having the magnetic head thereon.

6. A magneto-optical recording/reproducing device comprising:

a slider, having a magnetic head, that floats above a surface of a magneto-optical recording medium when the magneto-optical recording medium is in rotation;

a suspension, having a base section, that supports the slider, a depressing force being exerted on the slider in a vertical direction with respect to the magneto-optical recording medium; and adjustment means, having base section shifting means, for adjusting the depressing force exerted on the slider by the suspension according to a shifting of the base section shifting means, the base section shifting means shifting the base section in the vertical direction with respect to the surface of the magneto-optical medium so that a distance between the base section of the suspension and the surface of the magneto-optical recording medium decreases as the slider shifts to an outer part of the magneto-optical recording medium from an inner part.

7. A magneto-optical recording/reproducing device as set forth in claim 6, wherein the base section shifting means includes:

a supporting base that holds the base section and that has a first inclined face; and an inclined stand, having a second inclined face, that changes a height of the supporting base from the surface of the magneto-optical recording medium based on the fact that the first inclined face of the supporting base shifts with respect to the second inclined face, keeping contact with the second inclined face, a section of the suspension projecting from the supporting base bending downwards, the depressing force being adjusted according to a change in a bend angle of the section of the suspension projecting from the supporting base during a change in the height of the supporting base 8. A magneto-optical recording/reproducing device as set forth in claim 6, wherein the slider, has a first end and a second end that are at right angles with respect to a radial direction on the magneto-optical recording medium, the first end having an inclined face thereon that permits an air flow between the slider and the magneto-optical recording medium, and the second head having the magnetic head thereon.

* * * * *